June 4, 1957  J. SALAUZE  2,794,904
ELECTRIC LIGHTING APPARATUS
Filed June 9, 1954
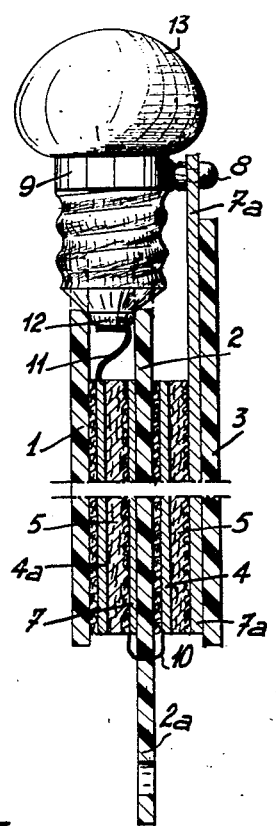
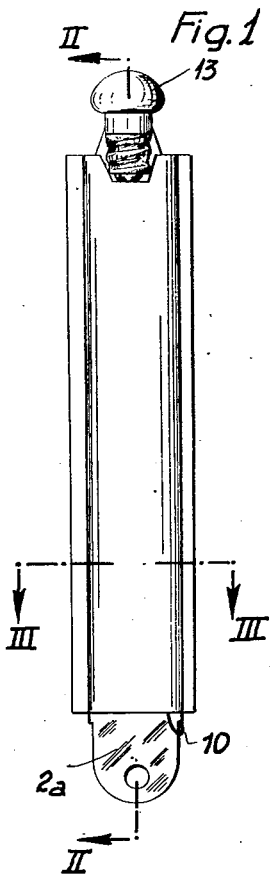
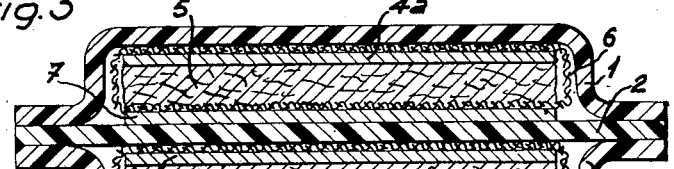
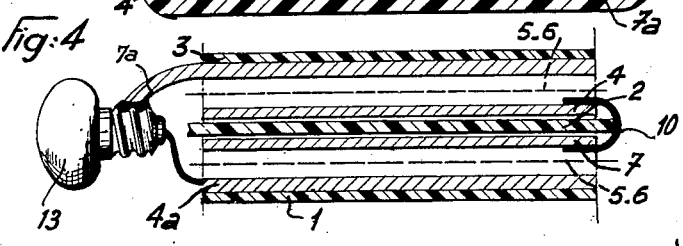
INVENTOR
JEAN SALAUZE
BY  Kenyon & Kenyon
ATTORNEYS

United States Patent Office 2,794,904
Patented June 4, 1957

2,794,904
ELECTRIC LIGHTING APPARATUS

Jean Salauze, Paris, France, assignor to Societe des Accumulateurs Fixes et de Traction (Societe Anonyme), Romainville, France, a company of France Application June 9, 1954, Serial No. 435,586

Claims priority, application France June 13, 1953

3 Claims. (Cl. 240—10.61)

The present invention relates to an electric lighting apparatus consisting of a battery of dry cells and an electric lamp bulb permanently associated with each other.

Lighting apparatus of this kind, intended to constitute sources of light, the life of which is co-extensive with that of the battery, are utilised for example in meteorology to enable test balloons released for exploration of the atmosphere, to be traced at night.

It is therefore necessary that the apparatus should provide illumination for a sufficient time whilst their weight must also be as small as possible.

The lighting apparatus in accordance with the invention comprises an insulating tubular casing of flat elongated form, and open at its two ends, the casing containing at least one cell of a primable battery constituted by two flat electrodes separated by a spongy diaphragm, the cap of the lamp being soldered laterally to one of the end electrodes of the battery of dry-cells which projects from the casing for that purpose, whilst the central contact stud of the said lamp is soldered to a conductor connected to the opposite end electrode of this battery.

In order to ensure a sufficient voltage, the battery is preferably constituted by a number of flat dry-cell elements coupled together and enclosed between two strips of insulating material, these elements being separated from each other by strips of the same material and the longitudinal parallel edges of all these superposed strips are stuck or welded together in such a way as to form a tubular casing having a number of parallel compartments and open at both ends.

The mutual connection of the various elements of dry batteries may thus be carried out at either one extremity of the casing or the other. In addition, by reason of the fact that these two ends are open, the priming of the dry battery may be very easily carried out by simply dipping them in a solution of electrolyte.

The batteries are preferably of the cuprous chloride-magnesium type which are primed by simply dipping in ordinary water, preferably salt water. In this case, the positive plates (copper) are preferably formed of particles of copper agglomerated by sintering, the sintered bodies thus obtained being impregnated with cuprous chloride in the manner described in my at one time co-pending United States patent application Ser. No. 390,671, filed on November 6, 1953, issued May 8, 1956, as Patent No. 2,744,948.

The description which follows below with respect to the attached drawings (which are given by way of example only and not in any sense by way of limitation) will make it quite clear how the invention may be carried into effect.

Fig. 1 is an elevation of a lighting apparatus in accordance with the invention.

Figs. 2 and 3 are enlarged cross-sections taken respectively along the lines II—II and III—III of Fig. 1.

Fig. 4 is a diagrammatic representation of the apparatus.

The apparatus shown in these figures comprises a tubular flat casing with two compartments, formed by three strips of plastic material 1, 2 and 3, for example, polyvinyl chloride joined to each other along their longitudinal edges, preferably by welding resulting from the simultaneous application of heat and pressure to the coupled edges of the said strips.

In each of the flat tubular compartments thus constituted, there is arranged one cell of a primable dry battery comprising a positive plate 4 on which is applied a bibulous sheet, for example of felted textile fibres 5, the plate and the sheet being wrapped up in a strip of material 6 folded back on itself. The negative plate 7 co-operates with the positive plate 4a and is applied against the wrapping material.

As has already been indicated in the preamble, the positive plate is preferably made of sintered copper impregnated with cuprous chloride. The material and the bibulous sheet may be made of cotton and the negative plate of magnesium which is with advantage rendered passive by treatment in a solution of potassium chromate.

The negative plate 7a is slightly longer than the other plates; it projects from the insulating casing and is provided at its extremity with a small copper rivet 8 which enables the cap 9 of an electric lamp to be soldered to this plate.

In Fig. 2, the positive plate 4 of the right-hand compartment is connected to the negative plate 7 of the left-hand compartment by a conductor 10 which passes out of one of the compartments to pass into the other at the end of the apparatus opposite to the electric lamp. This conductor 10 may be a spring clip which grips at the same time the two plates and the central insulating strip 2. The positive plate 4a of the left-hand compartment is provided at its upper part with a conductor 11, the extremity of which is soldered to the central contact stud 12 of the electric lamp.

As can be seen on the drawing, the upper extremities of the strips 1 and 2 are notched so as to provide a housing for the cap and to serve as a support for this latter.

The diagram given in Fig. 4 shows that, under these conditions, the two dry-cell units are connected in series and their circuit is completed through the lamp 13. The bibulous material and its wrapper are shown diagrammatically at 5, 6 in Fig. 4.

As shown in the figures, the central insulating strip 2 preferably comprises a small projecting tongue 2a provided with an eye so as to enable the apparatus to be hung up.

It will be readily understood that the simple action of dipping the apparatus vertically into a solution of electrolyte by the extremity opposite to the lamp, will impregnate the porous bodies 5 and 6, which completes the priming of the cells. The lamp 13 lights up and continues to shine until the cells are completely exhausted.

In a practical example of construction, a primed apparatus of this type weighed 20 grams and it was capable of supplying a quantity of electricity equal to 500 milliampere/hours at a tension of 2.8 volts. Furthermore, its electrical characteristics remained practically without appreciable variation with temperatures as low as —50° and with pressures as low as 30 millibars.

The apparatus in accordance with the invention is thus characterised by its great simplicity of construction, its very small weight and notwithstanding this, its excellent electrical quality.

In order to keep these apparatus after manufacture and before use, it is an advantage to wrap them in insulating bags which can be opened by tearing or by unsticking, so as to avoid the corrosive action of humidity in the surrounding atmosphere.

It will be understood that modifications may be made to the forms of embodiment which have been described above, in particular by the substitution of equivalent technical means, without thereby departing from the spirit or from the scope of the present invention.

What I claim is:

1. A self-contained electric lighting unit of the disposable single use type comprising a flat elongated tubular casing open at its two extremities, a partition dividing the casing internally into separate open-ended compartments, said casing being formed of superposed plastic strips of material joined along their longitudinal edges, a cell of a battery of the primable type within each of said compartments, each cell comprising an anode electrode and a cathode electrode and bibulous separator material between the electrodes, an electric lamp having a conductive cap and a central contact stud, means for electrically connecting and permanently securing one electrode of one of the cells to said cap, means for electrically and permanently connecting an electrode of another cell and of different polarity to said stud and means for permanently interconnecting the other electrodes of the cells to complete the battery whereby the electrodes and lamp are all permanently connected in circuit-closed condition, said battery being in an inactive state and the lamp being dark however, until the bibulous material is wetted with priming liquid, the open extremities of said casing permitting free access of priming liquid to the bibulous separator material for wetting thereof when such wetting is desired for activating the battery and thereby automatically lighting said lamp.

2. Self-contained electric lighting apparatus of the disposable single use type comprising a tubular casing open at both ends, a partition dividing the casing internally into two separate open-ended compartments, said casing and partition being of plastic sheet material joined together along contacting portions, cells of a primable battery disposed within the compartments, each cell comprising an anode electrode and a cathode electrode and bibulous separator material between such electrodes, an electric lamp having a conductive cap and a central contact stud, one electrode of one of the cells being longer than the other electrodes, a conductive connecting member secured to the prolongation, said member being permanently joined to said cap, means for electrically and permanently connecting an opposite polarity electrode of another cell to said central contact stud, and means for interconnecting the other electrodes of the cells to complete the battery whereby said lamp and electrodes are permanently connected in circuit-closed condition, said battery being in a passive state and said lamp being dark however, until the bibulous separator material of the cells is wetted with electrolyte, the open extremities of said casing permitting free access of electrolyte to the bibulous separator material for wetting thereof when it is desired to activate the battery and thereby automatically light said lamp.

3. A self-contained electric lighting unit comprising an insulating tubular casing of flat elongated shape and open at its two extremities, said casing being of plastic sheet material joined along longitudinal contacting edges, a battery of the primable type whose constituents include two flat elongated terminal electrodes and a spongy partition separating them arranged within the casing, an electric lamp having a metallic cap and a center stud, means for electrically connecting said cap directly and permanently to one of the terminal electrodes of said battery, and means for connecting the other terminal electrode electrically and permanently to the central contact stud of said lamp, whereby the battery electrodes and lamp are all permanently connected in circuit-closed condition, said battery, however, being in an inactive state and said lamp being dark until the spongy partition is wetted with a priming liquid, the open extremities of said tubular casing permitting free access of the priming liquid to the partition for wetting the latter and for activating the battery and thereby automatically lighing said lamp.

References Cited in the file of this patent

UNITED STATES PATENTS

| | | |
|---|---|---|
| 1,981,544 | Frech et al. | Nov. 20, 1934 |
| 2,063,070 | Winckler | Dec. 8, 1936 |
| 2,166,657 | Evelyn | July 18, 1939 |
| 2,387,144 | Gey | Oct. 16, 1945 |
| 2,428,850 | Lawson | Oct. 14, 1947 |